R. RAMBEAUD.
MECHANICAL DOUGH KNEADING DEVICE.
APPLICATION FILED OCT. 8, 1910.

1,049,600.

Patented Jan. 7, 1913.
4 SHEETS—SHEET 1.

Witnesses:
E. Heymann
M. Schmid

Inventor:
René Rambeaud
by B. Singer atty.

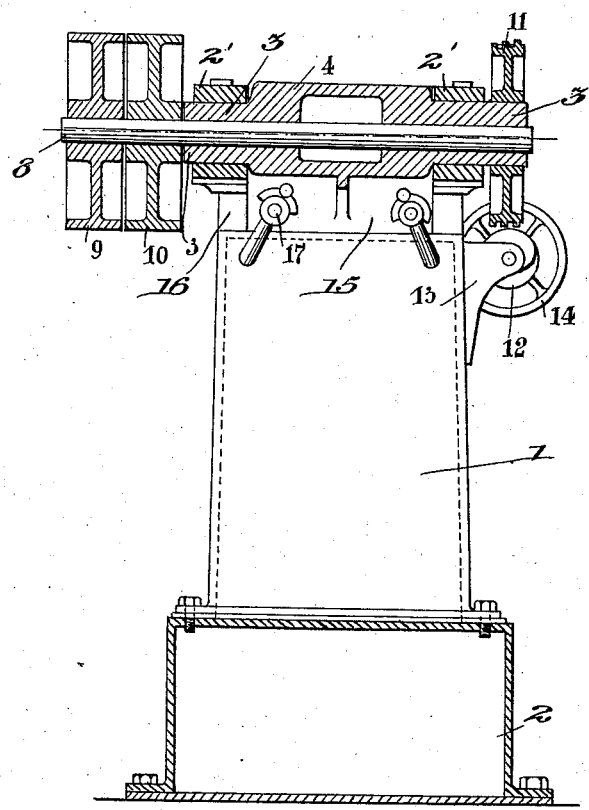

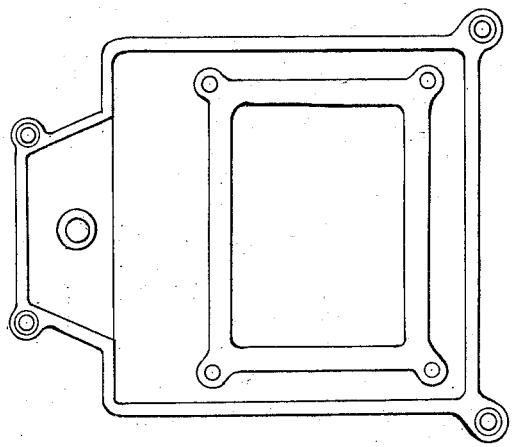
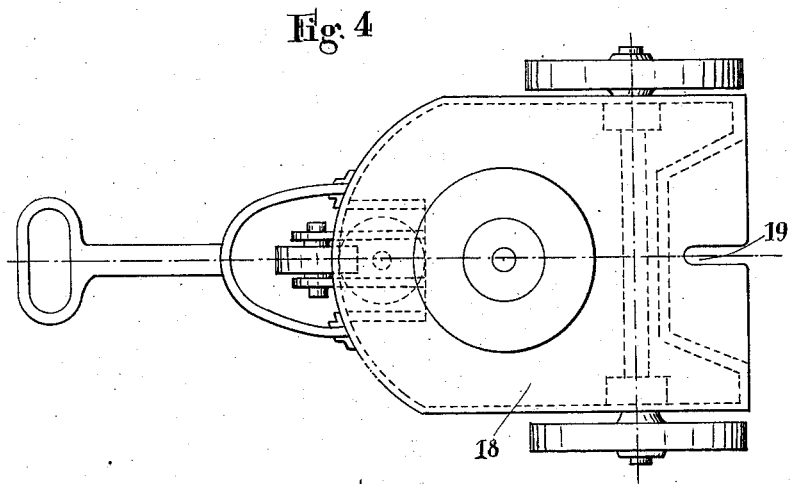
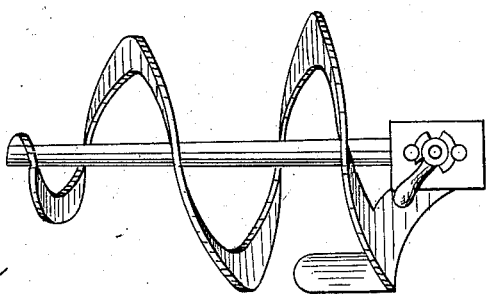

R. RAMBEAUD.
MECHANICAL DOUGH KNEADING DEVICE.
APPLICATION FILED OCT. 8, 1910.
1,049,600.
Patented Jan. 7, 1913.
4 SHEETS—SHEET 4.
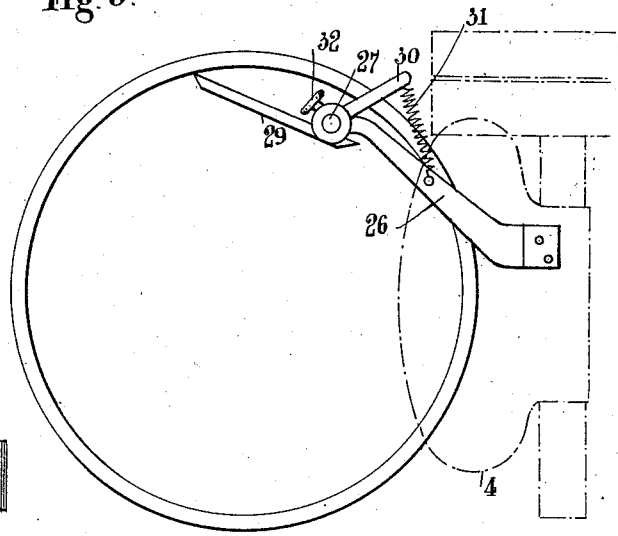
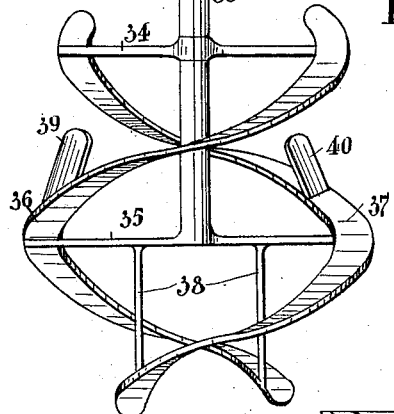
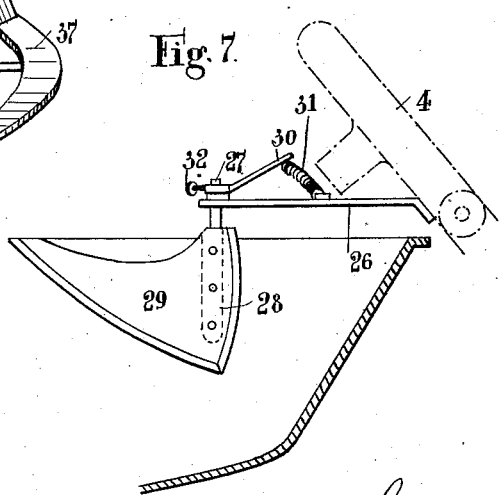
Witnesses:
C. Heymann
M. Schmid
Inventor
René Rambeaud
by P. Sirigu
atty.

UNITED STATES PATENT OFFICE.

RENÉ RAMBEAUD, OF PARTHENAY, FRANCE.

MECHANICAL DOUGH-KNEADING DEVICE.

1,049,600.   Specification of Letters Patent.   Patented Jan. 7, 1913.

Application filed October 8, 1910. Serial No. 586,041.

*To all whom it may concern:*

Be it known that I, RENÉ RAMBEAUD, a citizen of the French Republic, and resident of 2 Rue Romarin, Parthenay, Deux-Sèvres, France, have invented certain new and useful Improvements in Mechanical Dough-Kneading Devices.

This invention relates to a device for mechanically kneading dough in which the kneading device proper is mounted on a shaft carried by a frame work in such a manner that the kneading device may be tilted into a trough positioned in front of the framework and out from the said trough, the trough itself being mounted in a rotary manner on a vertical shaft carried by a carriage.

The advantages realized by the present arrangement are that the stirring device 
20 may be lifted out from the trough, and that the latter may be removed so that the trough employed, as well as the kneading device, may be replaced by devices of the same kind but not filled with dough. It will be easily understood that the kneading operation of the finished dough is therefore not interrupted.

Figure 6:
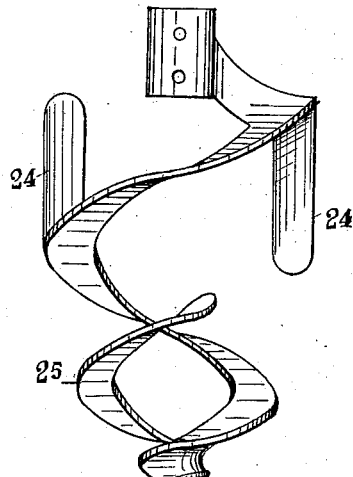
Figure 1:
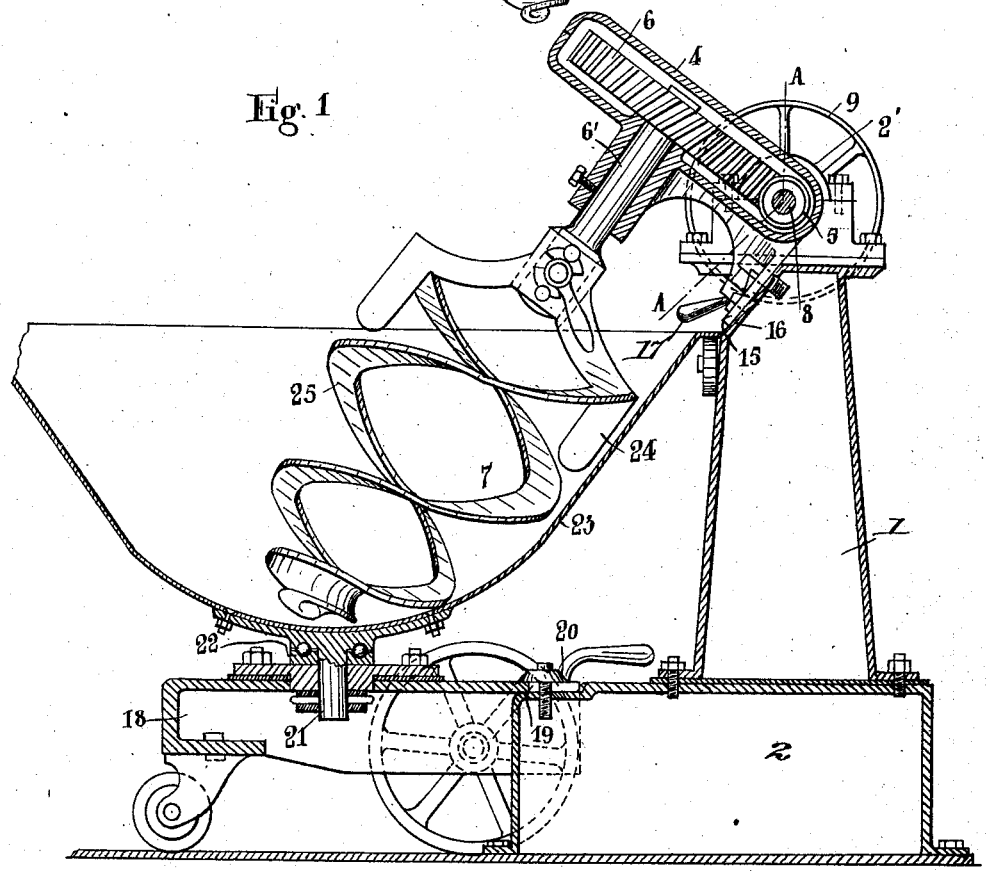

The accompanying drawings show several forms of embodiment of the kneading apparatus and in these drawings; Figure 1 shows a vertical axial section through the kneading apparatus complete; Fig. 2 is a section of the framework on line A—A of Fig. 1; Fig. 3 shows a top plan view of the carrying frame of the kneading device, Fig. 4 is a similar view of the carriage supporting the trough; Figs. 5 and 6 show forms of embodiment of the spiral kneading device; Fig. 7 shows the kneading apparatus provided according to this form of embodiment with a scraping member, this figure showing the apparatus partly in section, partly in elevation; Fig. 8 is the corresponding top plan view; Fig. 9 finally shows a third form of the kneading device.

The framework 1, which is secured to the base 2 by means of screws, is provided in its upper part with bearings 2′, adapted to contain the trunnion 3, of a casing 4, which is adapted to receive a worm gear 5 and 6. The latter causes the kneading device 7 to rotate.

The kneading device is secured in such a manner on the free end of a shaft 6′, of the worm wheel 6 that it may be easily taken off and replaced. The worm wheel 6 is driven by a worm 5, which is keyed on a shaft 8, which passes through the two trunnions 3, of the casing 4, and carries on one of its ends a loose and a fast pulley 9 and 10, respectively.

Secured to one of the trunnions 3, and this preferably to that one which is opposite to the belt pulleys 9 and 10, is a worm wheel 11, with a worm 12, which is supported in an arm 13 of the frame 1, and is adapted to be rotated by a hand wheel 14. The rotation of this hand wheel 14, in one or the other direction, causes the casing 4 to oscillate in the bearings 2 so that the kneading device 7 is either tilted into or out from the trough.

Now in order to prevent, during the kneading operation, the stirring device from being raised or from being forced aside by the resistance offered by the dough, the casing 4 is provided with an extension 15 which, when the stirring device assumes a lower position, engages a corresponding abutment 16, and is held in the desired position by devices 17.

The movable portion of the kneading apparatus includes a carriage 18 which is provided with a slot 19, and the carriage may be temporarily connected with the frame 1 by a screw 20 passing through said slot into the frame. The trough 23 is supported by means of a ballbearing 22, on the carriage 18. As will be readily seen, the trough may be rotated if necessary on stud 21.

The stirring device 7 may be provided, according to the work which it has to do, with one or two spiral threads. (Figs. 1 and 5.) The upper thread of each spiral carries a blade 24 which projects toward the second thread. The special manner in which the various spiral threads are arranged and the blades curved will be readily seen from inspection of the drawings. The blades are arranged in such a manner that during the work of the apparatus they scrape along the inner wall of the trough 23.

The stirring device may be constructed in the manner shown by Fig. 6; that is to say, it may be provided with two spiral threads which extend on a certain portion of the length of the device, and terminates at a distance from the connecting sleeve for the driving shaft, a distance which is about equal to the height of a thread. Owing to this arrangement, one may employ two parallel arms 24 which are arranged opposite each other.

The function of this device is as follows: After the trough has been filled with flour, liquid and other additions, the apparatus is rotated by causing the belt to run on the pulley 10. As will be readily seen, the shaft 8, and the worm 5, rotate the worm wheel 6, keyed on the shaft 6'. The stirring devices may be changed so as to adapt the apparatus to suit the nature of the dough.

The kneading device is caused to rotate after having been tilted into the trough. The inclined blades 25 convey the dough to the upper part of the kneading device forcing it at the same time toward the upper edge of the trough until it meets with the blades 24. The latter pull the dough laterally and cause it to descend. As will be readily seen, hand kneading is hereby perfectly imitated and the necessary air is introduced into the dough. As the trough 23 is adapted to rotate all the parts of the dough are successively stirred without any interruption. When the kneading operation is finished, the hand wheel 14 is rotated in such a manner that the kneading device is lifted out from the trough. The worm 12 causes the worm wheel 11 to rotate the trunnions 3. The casing 4 is consequently tilted backward so that the kneading device, as already stated is lifted out of the trough. When it is desired to remove the trough the operator releases the locking device 20. In order to facilitate the change of the trough of the carriage, the front of the frame has a trapezoidal form (Fig. 3). That part of the carriage which engages the front of the frame is formed to accurately fit the shape of said frame. The cutaway part of the carriage plate simply glides under the nut on the screw 20 so that by simply tightening said nut a rigid connection between the frame and the carriage is obtained.

In the form of embodiment shown by Figs. 7 and 8, the kneading apparatus is provided with a scraper. The casing 4 is provided with an arm 26, which is preferably secured on the lower surface of the casing. The free end of this arm is provided with a vertical bore and receives a tenon 27, on a plate 28, to which the scraper 29 is secured. Secured to the upper end of the tenon 27, which is provided with a shoulder engaging the arm 26, is a handle 30 connected with the arm 26, by means of a spring 31. The handle 30 may be adjusted with respect to the tenon 27 so that the tension of the spring 31 may be changed. 32 designates a set screw for the handle 30. As soon as the kneading device has been tilted into the trough the front edge of the scraping blade 29 which is positioned at a short distance in front of the kneading device, applies itself against the inner surface of the trough, as shown in Fig. 2. The edge which comes into contact with the surface of the trough is preferably knife shaped and is applied with some pressure of the spring 31. The opposite edge is at a certain distance from the inner surface of the trough so that the dough removed from the said inner surface is conveyed toward the kneading device. Owing to this arrangement, the kneading operation is much more complete, and as the scraping device is also secured to the casing 4 it is removed from the trough at the same time as the kneading device.

The dough stirring or kneading device shown by Fig. 9, comprises a shaft 33 to which two cross bars 34 and 35 are secured by means of tenons, which cross bars serve to hold the spiral threads 36 and 37. The lower cross bar 35 is provided with two blade supports 38 which are parallel to the shaft 33 and support the lower spiral threads. The blades 38 are sharpened like knives, in the direction of the rotation, and thus are adapted to separate the dough. As the screw threads 36, 37 are not rigidly connected together at their lower ends, the mass of dough may freely pass between them and consequently always renew itself owing to the rotation of the trough. 39 and 40 designate projections provided on the screw threads 36, 37 and which serve to draw out the dough and to aerate it.

I claim:

1. A kneading apparatus comprising in combination, a supporting structure, a receiver thereon, and a kneading device for said receiver adjustably mounted on said structure and comprising opposing spirally formed blades converging from their upper toward their lower end and provided with scraping arms.

2. A kneading apparatus comprising in combination, a supporting structure, a receiver thereon, and a kneading device projecting into said receiver and comprising opposing spirally formed blades converging from their upper toward their lower ends and provided with downwardly directing scraping arms at their upper ends, substantially as described.

3. A kneading apparatus comprising in combination, a receiver for the material to be treated, and a kneading device projecting into said receiver comprising a spiral blade portion having its spiral formed to pull the material upwardly in said receiver, and blades arranged to downwardly direct such upwardly pulled material, substantially as described.

In testimony whereof I have hereunto set my hand in presence of two witnesses.

RENÉ RAMBEAUD.

Witnesses:
C. KINLE,
L. BOULEAU.

Copies of this patent may be obtained for five cents each, by addressing the "Commissioner of Patents, Washington, D. C."